(12) United States Patent
Cook (10) Patent No.: US 7,672,036 B2
(45) Date of Patent: Mar. 2, 2010

(54) NON-LINEAR OPTICAL BODIES AND DEVICES

(75) Inventor: Gary Cook, Malvern (GB)

(73) Assignee: QinetiQ Limited, Farnborough, Hants (GB)

( * ) Notice: Subject to any disclaimer, the term of this patent is extended or adjusted under 35 U.S.C. 154(b) by 1748 days.

(21) Appl. No.: 10/148,672

(22) PCT Filed: Dec. 1, 2000

(86) PCT No.: PCT/GB00/04575

§ 371 (c)(1),
(2), (4) Date: Jun. 3, 2002

(87) PCT Pub. No.: WO01/40860

PCT Pub. Date: Jun. 7, 2001

(65) Prior Publication Data

US 2002/0181072 A1    Dec. 5, 2002

(30) Foreign Application Priority Data

Dec. 3, 1999    (GB) ................... 9928473.9

(51) Int. Cl.
*G02B 26/00*    (2006.01)

(52) U.S. Cl. ............... 359/296; 359/237; 359/238; 359/290

(58) Field of Classification Search ........... 359/296, 359/328, 329, 573, 237, 326, 558, 238, 290, 359/566; 252/582, 584; 600/407, 473, 476–478, 600/310, 317, 341, 342
See application file for complete search history.

(56) References Cited

U.S. PATENT DOCUMENTS

| 3,490,050 | A |   | 1/1970  | Weiner |
|-----------|---|---|---------|--------|
| 3,679,907 | A | * | 7/1972  | Bonner et al. ............... 359/328 |
| 4,839,536 | A | * | 6/1989  | Etter et al. .................. 359/328 |
| 4,986,635 | A |   | 1/1991  | Spry |
| 5,173,811 | A |   | 12/1992 | Gumbs |
| 5,253,103 | A | * | 10/1993 | Boyd et al. .................. 359/329 |
| 5,452,123 | A | * | 9/1995  | Asher et al. ................. 359/296 |
| 5,993,701 | A | * | 11/1999 | Ando et al. .................. 252/582 |
| 6,002,522 | A | * | 12/1999 | Todori et al. ................ 359/573 |
| 6,111,776 | A | * | 8/2000  | Russell ....................... 365/124 |

FOREIGN PATENT DOCUMENTS

WO    89/03054 A    4/1989

OTHER PUBLICATIONS

Patent Abstracts of Japan, vol. 013, No. 460, p. 946, Oct. 18, 1989, & JP 01 179921 A, Jul. 18, 1989, Abstract.

* cited by examiner

*Primary Examiner*—Brian Casler
*Assistant Examiner*—Baisakhi Roy
(74) *Attorney, Agent, or Firm*—Nixon & Vanderhye P.C.

(57) ABSTRACT

The need to have a large single crystal of photorefractive material for devices such as optical limiters, optical memory, and beam couplers, is avoided by providing a photorefractive body (42) comprising small photorefractive particles (44) coupled by a couplant (43), for example glass, which is refractive index-matched to the particles. Such a body may comprise a fiber (42), or a bulk body (80). For many uses it will be necessary to align the photorefractive particles in the body and this can be achieved using fluid flows or electrostatically. Methods of making the particles, and of making photorefractive bodies are disclosed. Devices incorporating particle-couplant matrix bodies are disclosed.

24 Claims, 11 Drawing Sheets

Fig. 3 Conventional 2-beam coupling

Fig. 5 180 degree 2-beam coupling

Conventional two-beam coupling

1/e speed = 1.9msec

NON-LINEAR OPTICAL BODIES AND DEVICES

This application is the US national phase of international application PCT/GB00/04575, filed in English on 1 Dec. 2000, which designated the US. PCT/GB00/04575 claims priority to GB Application No. 9928473.9 filed 3 Dec. 1999. The entire contents of these applications are incorporated herein by reference.

BACKGROUND OF THE INVENTION

1. Field of the Invention

This invention relates to a non-laser optical bodies and devices, and especially, but not exclusively, to photorefractive devices and methods involving photorefractive materials.

2. Discussion of Prior Art

Photorefractive materials are materials whose refractive index varies dependent upon the gradient of changing light intensity in the material. Such materials are typically crystals, but can be polymers or liquid crystals.

Non-linear optics are crucial to many applications, ranging from laser systems to data storage. Many of these applications rely on the non-linear optical properties of single crystal materials. Unfortunately, many of these materials are difficult to grow successfully in sizes that are sufficiently large for the intended applications. This has severely limited the usefulness of a wide variety of non-linear optical crystals.

SUMMARY OF THE INVENTION

It is an aim of the present application to ameliorate the above problem.

According to a first aspect, the invention comprises an optical body having non-linear optical properties, the body comprising regions or particles of a first material optically coupled by a couplant material, the first material comprising non-linear optics material.

Thus, there is no single large crystal provided: instead a body with coupled smaller non-linear optics regions (or crystals) is provided. The couplant material is preferably a linear optics material.

Preferably the refractive index of the first material is matched to that of the couplant material, preferably to at least 1, 2, 3, 4, or more decimal places. The refractive indices may be matched over an optical range of wavelengths. They may be matched over 400 to 750 nm.

Preferably the first material comprises a photorefractive material.

The first material may comprise, preferably doped, lithium niobiate (Li NbO$_3$), preferably iron-doped; or preferably doped, lithium tantalate, or potassium lithium niobiate (doped or undoped), or preferably doped, potassium niobiate, or lead magnesium niobiate (doped or undoped), or barium titanate, strontium barium titanate, or strontium barium niobiate, or potassium sodium barium niobate, or the like. The first material preferably comprises a photorefractive material which produces a significant voltage across a particle of the material. The first material may be photovoltaic, or piezoelectric (voltage due to strain), or pyroelectric (voltage due to heat).

Preferably solid particles of first material are present, but non-solid, e.g. liquid regions may be an alternative. The body is preferably self-supporting, and preferably solid, most preferably rigid.

The particles or regions of first material preferably each comprise a single crystal, preferably with a single crystal domain. Particles may have more than one domain, in which case particles with a small number of domains are preferred, preferably an odd number. Preferably the particles or regions are uniaxial, but they could be of biaxial crystal material.

Preferably the couplant material comprises a glass or polymer, transparent at the wavelength of use of the body.

Preferably there are tens, hundreds, thousands, or tens of thousands, hundreds of thousands, or more, of the regions or particles of first material in the body. Preferably the regions or particles are substantially randomly distributed in the body (but their distributions could be ordered). Preferably the regions or particles are orientated in substantially a common direction, or at least a significant number of adjacent particles or regions are substantially orientated in a common direction (but they could be randomly orientated).

The regions or particles may have an elongate length. The body may have an elongate length. The particles or regions may be aligned with the longitudinal direction of the body, or they may be aligned with a direction inclined at an angle to the longitudinal direction of the body transversely (e.g. aligned, possibly at about 45°, or substantially perpendicularly). The body may comprise a fibre or filament. Alternatively, the body may comprise a three-dimensional shape, such as a geometrical shape, or it may comprise a layer or coating. The length to width ratio of the particles may be about 1:1, 4:3, 3:2, 2:1, 4:1, 8:1, 16:1, 32:1, 100:1, 200:1, or more, or any range defined between any of the aforesaid boundaries.

The particles or regions are preferably long enough to create a diffraction pattern of regions of different refractive index within each particle.

The particles are preferably capable of having a turning moment produced on them. The turning moment may be achieved by the particles having, or being capable of having, an electromagnetic dipole.

The particles or regions may be cigar-shaped (ellipsoidal), or cylindrical, or spherical, or rhomboidal, or rectangular, or generally cubic. The particles are preferably solid, and preferably crystalline, but some polymer particles may have suitable properties, as may liquid crystal "particles" or regions.

The particles or regions may have a greatest dimension of the order of a micron. For example the particles may be 0.5μ to 10μ, or to 51μ long, or they may be 1-3μ long, 1-5μ long, or smaller. The particles are preferably larger than about 0.1μ. Submicron particles are also envisaged. The particles may have a size that is in the range 0.05μ to 200μ, preferably in the range of 0.1μ to 20μ. The size of a particle may be its largest dimension.

It may be desirable to reduce the number of domains in a particle by heating it to above the Curie temperature of the material and applying an electric field, and allowing the particle to cool. However, it is preferred to have the particles sufficiently small that the formation of a unidomain particle is energetically favoured. There is, it is believed, a window between the desire to have particles that are large enough to get proper fringe spacings in use (with the wavelength of interest, typically an optical wavelength) so that non-linear optical effects are observed, and the desire to be small so as to favour unidomain crystals. It is believed that if the particles are of the order of, say, 1-3 μm, then the fringe spacing will be λ/2n, with a typical n being about 2, and for an optical wavelength of, say, 400 nm, this gives fringe spacing of about 100 nm, and so there can be about 10 fringes in the particle. It is believed particles of the order of 1-3, or 1-5 μm tend to form unidomain crystals.

The body may have one or more first, aligned, zones where the particles or regions in that zone are collectively generally aligned with each other, and one or more second zones where the particles in the second zones are not collectively aligned with the particles in the first zone(s). Preferably, the body has a plurality of first zones with the particles in each first zone being collectively aligned in a common orientation, and preferably a plurality of second zones interposed between the first zones, the particles in the second zones not being collectively aligned in the first zone orientation. The first zones may be regularly spaced. The second zones may have particles with no substantial ordered alignment, or the second zones may have particles generally aligned in a common direction for a particular second zone. The particles of each second zone may be aligned in a common direction. The body may have periodic first zones with particles aligned in a common first direction and periodic second zones with particles aligned in a common second direction, the first and second zones alternating in the body.

According to a second aspect the invention comprises a method of providing or making a body having a non-linear optical property comprising providing a plurality of particles or regions of non-linear optical material coupled together by an optical couplant material.

The method preferably comprises a method of providing a photorefractive body.

Preferably the method comprises aligning the particles or regions in the body so that they operate upon light incident from at least one direction in a common manner.

Preferably the method comprises having crystalline particles or regions with a crystallographic axis and aligning at least one axis of the crystalline particles in the body.

The alignment of the particles may be achieved by mechanical means, such as by the effect a flowing a fluid. For example, the fluid may carry the particles through a passageway. The particles may be of such a length that they are constrained to enter the passageway in a single orientation, or in a limited range of orientations.

The alignment may be achieved electrostatically. The method may comprise creating a dipole moment on the particles, preferably an electric dipole. The method may also comprise applying an electromagnetic field (e.g. electric field) so as to align the particle dipoles, and hence align the particles. The dipole may be created by illuminating a photovoltaic particle or region; or by causing strain in a piezoelectric particle or region (e.g. by applying ultrasound), or by heating a pyroelectric particle. The dipole is preferably created while the particles are mobile relative to the couplant medium/material. Preferably an orientation-inducing field is applied whilst the particles are charged and in a mobile state relative to the couplant material. Preferably a substantial number of the particles or regions, and most preferably substantially all, have only one domain during the orientation operation, and also preferably after the orientation operation. Preferably a substantial number of adjacent particles are aligned in a common direction. Most preferably substantially all particles that are moved during the orientation operation are moved towards the same common orientation direction.

Preferably the couplant is liquid during the orientation operation, and most preferably after the orientation operation the couplant is solidified. This may be achieved by cooling the couplant, or by a chemical reaction, such as polymerisation.

Optical bodies with non-linear optics have a wide range of applications, including (but not limited to): optical limiters and optical isolators (for limiting the intensity of light passing through them); optical memory devices for storing data; optical beam couplers; and in photonic crystal and photonic bandgap devices. The device may comprise a display screen, or a telecommunications component. Protection for the above devices is sought.

According to a further aspect the invention comprises a device having an optical body in accordance with the first aspect of the invention (or made in accordance with the second aspect), in which the device preferably comprises one of: an optical limiter or isolator; an optical memory; an optical beam coupler; a photonic crystal device; a photonic bandgap device.

Other areas of application may include a "glass" that is transparent in one direction only. Protection for such "glass", and an article with such "glass" is sought. It will be appreciated that "glass" can cover polymerisation products.

According to another aspect the invention comprises a method of making a body having non-linear optical properties comprising coupling particles with non-linear optical properties with a couplant material to form a particle-couplant matrix.

According to another aspect, the invention comprises the use of a plurality of particles with non-linear optical properties optically and physically coupled together by a couplant material to provide a body having non-linear optical properties.

According to another aspect the invention comprises the use of particles with non-linear optical properties in the preparation of couplant-particle matrix body for use in a non-linear optical device.

We are aware of some earlier documents. U.S. Pat. No. 5,963,360 discloses a polymer-based thin film material. It uses particles as a chi(3) non-linear, and non-photorefractive, medium. It has grains of semiconductor or metal. U.S. Pat. No. 5,508,829 discloses having particles of Group V metal in an optical storage medium. U.S. Pat. No. 5,432,635 discloses a chi(3) non-linearity device with both metal and semiconductor particles in a glass matrix. U.S. Pat. No. 5,253,103 discloses sub-wavelength particles of semiconductor in a glass matrix. U.S. Pat. No. 5,726,796 discloses using an induced bulk refractive index change to achieve optical limiting, and has thermally or optically induced refractive index changes in particles. U.S. Pat. No. 5,452,123 discloses using colloidal spheres of silica in a doped lithium niobiate crystal to provide an optical switching device.

BRIEF DESCRIPTION OF THE DRAWINGS

Embodiments of the invention will now be described by way of example only with reference to the accompanying drawings, of which.

DETAILED DISCUSSION OF EMBODIMENTS

Figure 1:
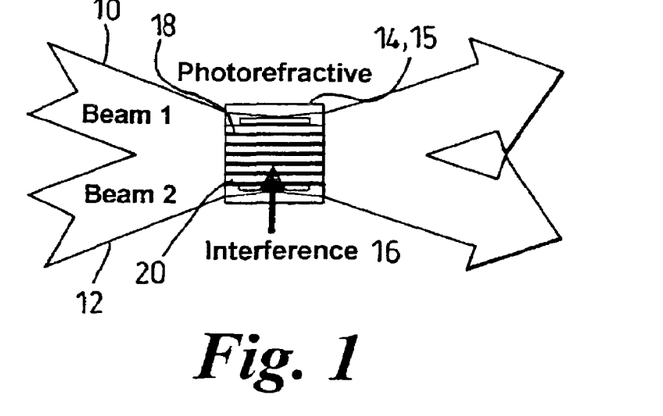
FIGS. 1 and 2 illustrate the principles of a photorefractive crystal producing an interference pattern within itself when illuminated by intersecting beams.
Figure 2:
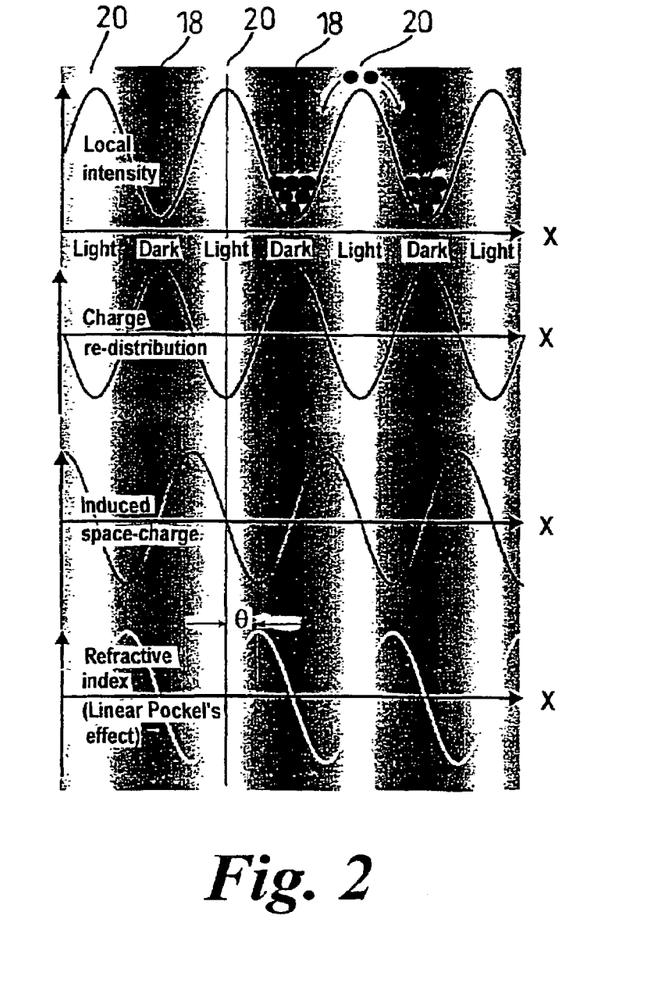

FIGS. 1 and 2 serve as a basic reminder of the main principles of photorefractive non-linear optics. When a first beam 10 and a second beam 12, inclined to the first beam, meet in a crystal 14 of photorefractive material 15 they set up an interference pattern 16 which is lines of dark 18 and lines of bright light 20. The photorefractive material 15 has its refractive index changed 90° out of phase with the bright lines 20, and thus a hologram of bands of different refractive index regions is written into the crystal 14.

Figure 3:
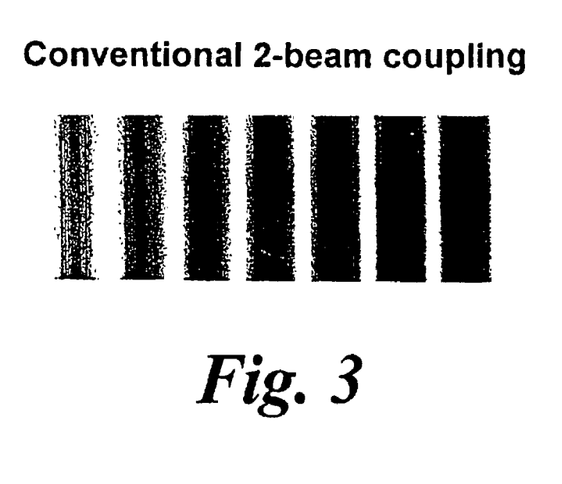
FIGS. 3 and 4 illustrate how the principle of FIGS. 1 and 2 can be used to couple beams.
Figure 4:
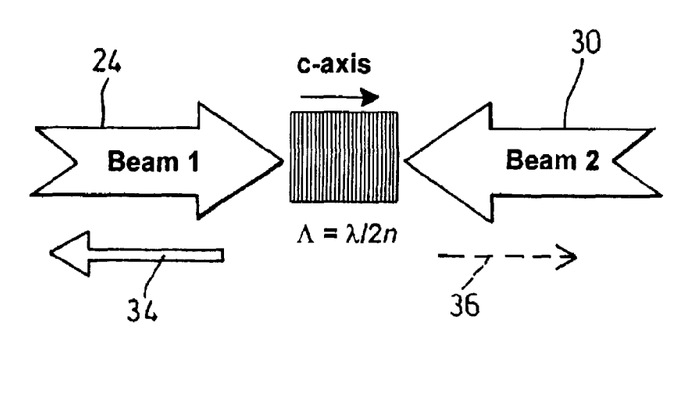

The diffraction hologram formed by the diffraction pattern 16 can be used to couple two beams as schematically illustrated in FIGS. 3 and 4 by having constructive interference occur in one direction of output (direction references 22). As best shown in FIG. 4, an input beam 24 can be arranged to be split by a beam splitter 26 and the split beam 27 directed onto a mirror 28 which can be controlled to create a signal beam 30. The coherent beams 24 and 30 interact in the photorefractive crystal 14 and the interference pattern is arranged to give a constructive diffraction direction of output, direction 22. The "other" beam, referenced 32 in FIG. 3, is not really present (or is very weak) since it represents a destructive direction of interference. Beam 22 is an amplified signal beam, and beam 32 is an attenuated input beam. The power of the output signal can be arranged to be substantially the sum of the input signals, less absorption.

Figure 5:
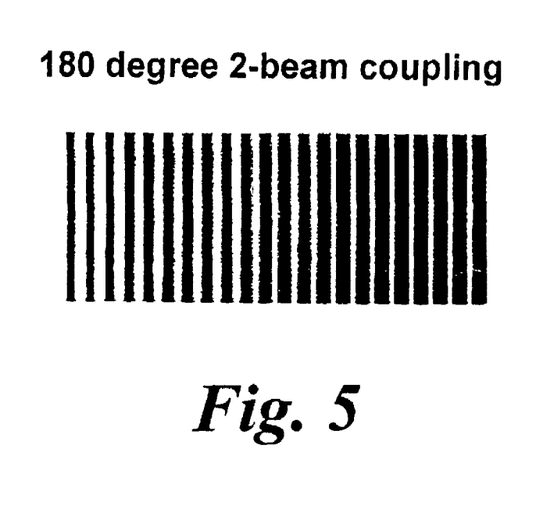
FIG. 5 shows 180° two-beam coupling using a photorefractive crystal.

FIG. 5 shows an alternative, counter propagating, way of coherently coupling two beams in which the C-axis of the photorefractive crystal is orientated parallel to the direction of the input beam 24, and the signal beam 30 enters at 180° to the input beam. The diffraction pattern can be arranged so that the majority of the power of the combined/diffracted beams is present in output signal beam 34, with little or substantially no power in "transmitted input beam" 36. It will be noted from FIG. 5 that the interference fringes of the 180° coupling are closer together and sharper than those of FIG. 3.

Figure 7:
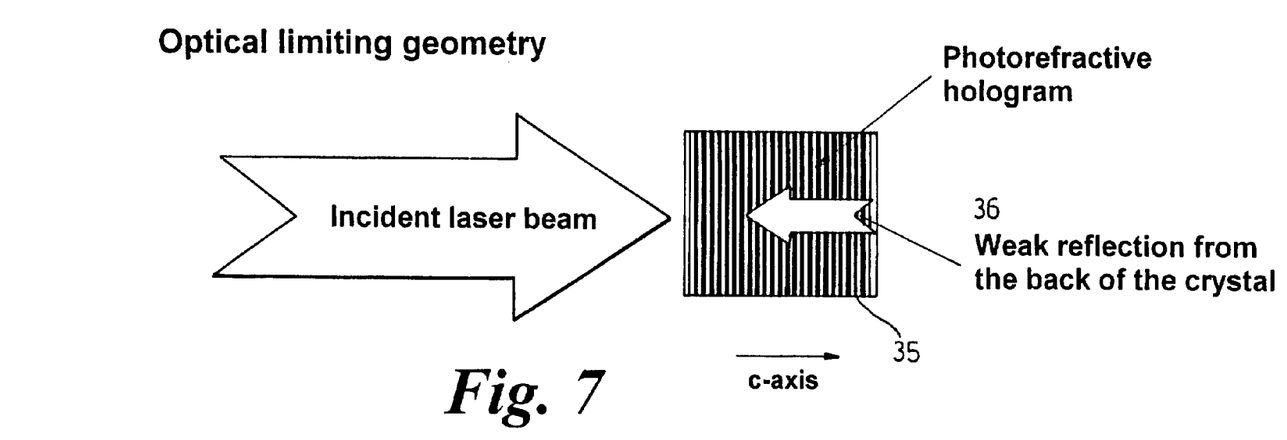
FIGS. 7 and 8 show the application of the ideas of FIG. 5 to an optical limiter.

FIG. 7 shows how a crystal, referenced 35, of refractive material can be an optical limiter by having the reflection 36 from a face of the crystal comprise the signal beam. Thus, the crystal 35 passes very little light in the direction of its C-axis (but will pass light in the opposite direction).

Figure 8:
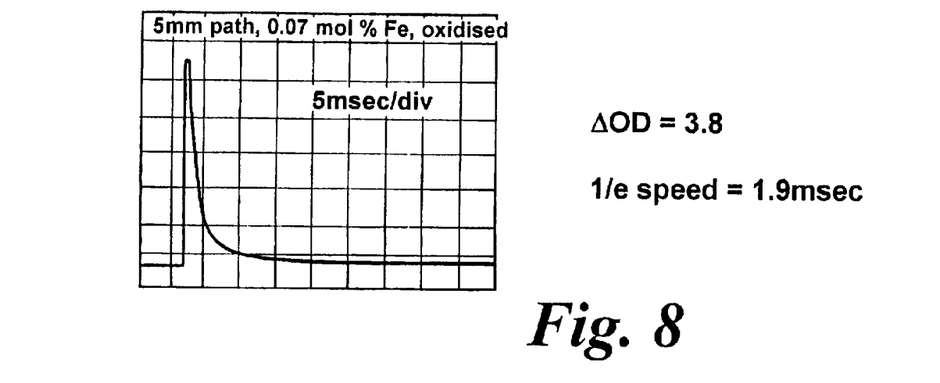

FIG. 8 shows a typical speed of response for an iron-doped lithium niobate (Fe—$LiNbO_3$) crystal, and as will be seen the light transmitted falls to substantially nothing in about 15 ms, and the speed to decrease the intensity to 1/e of the original intensity is about 2 ms.

Photorefractive devices with large (e.g. 1 cm, 2 cm, or longer) crystals do work well, but the large single crystals are expensive and difficult to grow.

It has been appreciated that there is no need to have a single large photorefractive crystal. It is possible to achieve the same effect, and indeed better effects in some ways, by incorporating particles of photorefractive material in a glass, polymer, or other couplant (usually split) body.

By incorporating particles of crystalline materials into an amorphous glass or plastic host medium which has the same (or very similar) refractive index as the non-linear crystal material, it may be possible to "cast" large volumes of the glass-particle matrix (GPM) without having to grow single crystals to the required sizes. The non-linear optical properties of the GPM depend on the individual particles being themselves single crystals, and in some applications upon the macroscopic alignment of the particles with respect to each other. In other words, for some applications, all of the single crystal particles must be aligned such that their crystalline axes point in the same direction. The particles can automatically be made into single crystals by arranging for their size to be sufficiently small. When this happens, the relative contribution of the domain boundary energy to the total energy of the particle increases to the point where it is no longer energetically favourable to form domains, and single crystal particles result.

There are applications, for example an optical limiter, where alignment of the particles may be unnecessary. An optical memory device may also not require alignment of the particles.

Figure 9:
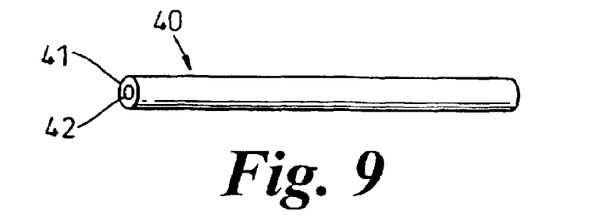
FIGS. 9 to 16 show schematically glass-particle-couplant matrix (GPM) fibres that have non-linear optical properties.
Figure 10:
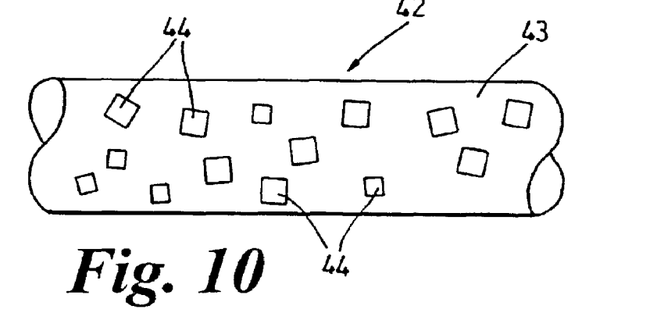

FIG. 9 shows an optical glass fibre 40 having a core 41 surrounded by cladding 42. The cladding has a lower refractive index than the core (for example by about 0.1, or more). The fibre is a few cm long, for example 2 to 5 cm long. The core is shown in FIG. 10 and comprises a glass couplant matrix 43 in which is embedded a large number of crystal particles 44. The particles 44 are non-linear uniaxial ferroelectric particles. Each particle comprises a single domain. The particles are generally randomly distributed throughout the core, but they could be distributed in an ordered pattern or manner. The particles in the example of FIGS. 9 and 10 are each orientated in the same direction (their C-axes extend in the same direction). The C-axes may be orientated generally parallel to the longitudinal axis of the fibre, or they may be orientated in a different direction, for example a few degrees off-axis, or substantially perpendicularly to the axis of the fibre, or at generally 45° to the fibre axis.

In another embodiment the C-axes of the particles can be randomly orientated relative to each other (or at least they do not all have to extend in the same direction).

The refractive index of the glass matrix 43 is matched to that of the same direction crystals 44, preferably to at least one decimal place, and most preferably to at least two decimal places. Matching of the refractive indexes to three, four, five, or more decimal places may be achieved and may be desirable. A typical refractive index for the glass and crystal particles might be about 2.

The temperature of the fibre/couplant-particle matrix body may be controlled to achieve better refraction index matching (n depends upon temperature and Δn with temperature is different for most pairs of materials).

In the example of FIGS. 9 and 10 these are particles of only one kind/composition. It may be desirable to have couplant-particle bodies with a first kind of particles/crystals made of a first material, and a second kind of particles made of a second, different, material. More than two kinds of particle crystal compositions may be present. Particles (whether of the same material or not) may be of more than one size and/or shape in a particle/couplant matrix.

Figure 11:
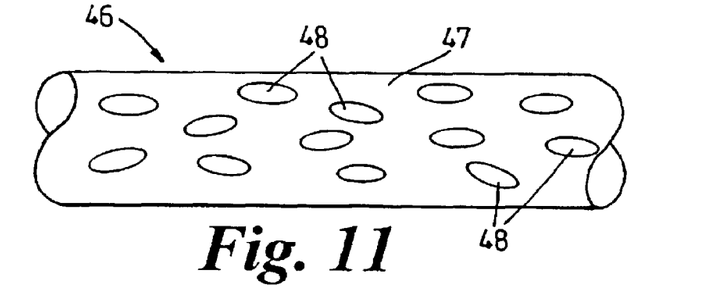

FIG. 11 shows another optical fibre 46 which has a glass/crystal particle matrix, the glass being referenced 47 and the particles 48. The particles 48 are elongate ellipsoids, or cigar-shaped.

Elongate particles might be made longer than the diameter of the core of a clad fibre, or longer than the diameter of a fibre/body. Particles could be 10μ long, or longer. The particles could be longer than the wavelength of light used or substantially the same size as the wavelength. The particles could be 4500μ, 1 mm, several millimeters, or even larger/longer.

As will be seen from FIG. 11, the particles 48 have their elongate axes generally/substantially aligned with the main elongate axis of the fibre 46 (or body). However, there is some divergence of alignment between particles, and some particles may be aligned 0, 5, 10, 15, or 20, or more degrees off-axis (or within a range defined by any of these points).

Figure 12:
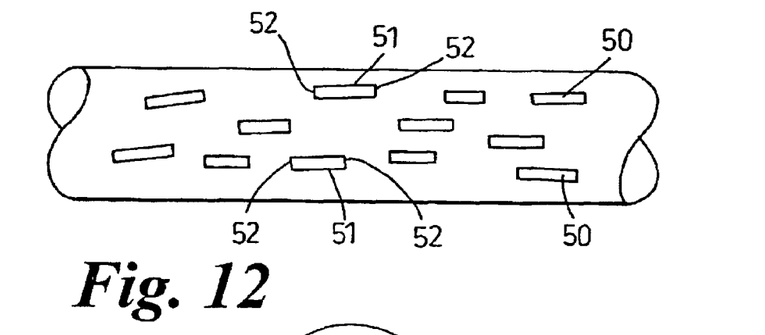

FIG. 12 shows a similar arrangement to that of FIG. 11, except that the particles, referenced 50, are aligned to a greater extent and substantially all of the particles are aligned substantially parallel with each other (and in this example parallel to the axis of the fibre/body). Furthermore, the particles of FIG. 12 are more angular and have substantially flat faces, such as flat side faces 51. They may also have flat end faces 52, which are typically orthogonal to the side faces (but could be at an inclined angle).

In an alternative embodiment the particles 50 could have a cylindrical form, with or without end faces at 90° to the curved side surfaces.

Figure 13:
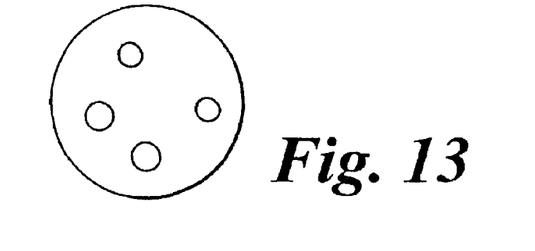

FIG. 13 shows a cross-section through a fibre with aligned cylindrical particles.

Figure 14A:
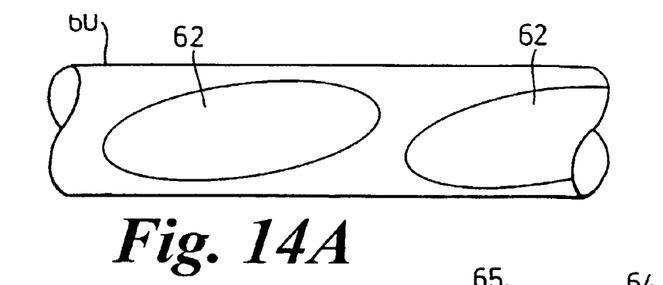
Figure 14B:
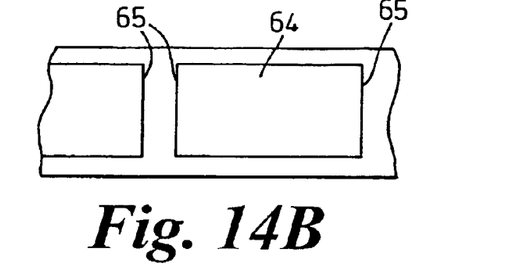

FIGS. 14A and B shows a core 60 of clad fibre (cladding not shown) in which particles 62 are coupled by a glass material, and in which the particles are of a substantial diameter in comparison with the fibre. In the example of FIGS. 14A and B, the particles have a diameter that is over half of the diameter of the fibre/body. At most positions along the length of the fibre there is only one particle in a perpendicular cross-section.

The particles 62 of FIG. 14A are cigar-shaped. The particles, referenced 64, of FIG. 14B are generally parallelepiped-shaped, with a rectangular or square cross-section and flat end faces. They could have a different cross-section, for example having 3, 4, 5, 6, 7, 8, or more sides. The number of side surfaces of the crystal may depend upon the natural shape of the crystals. In FIG. 14B, the end faces, referenced 65, of the adjacent crystals are generally facing each other. The gap between crystals may be shorter than the length of the crystals.

Of course, FIGS. 9 to 14 could represent cores of clad fibres, as well as unclad fibres.

Figure 15:
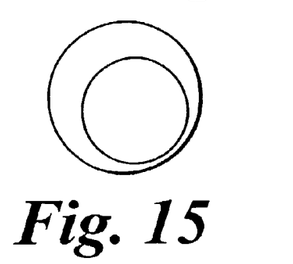

FIG. 15 shows a cross-section through the fibre core 60 of FIG. 14A.

Figure 16:
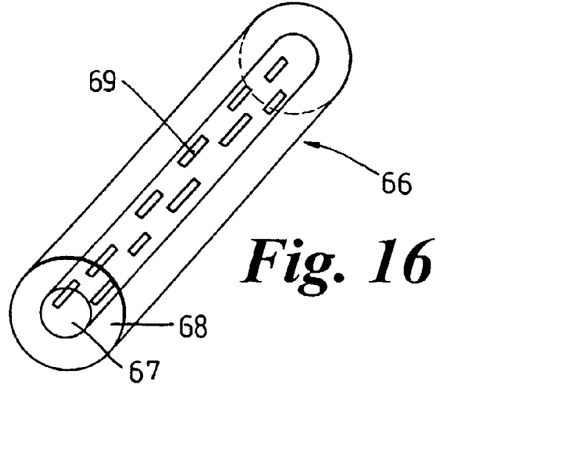
Figure 17A:
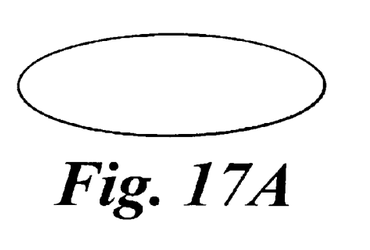
FIGS. 17A to 17E show schematically different shaped particles as may be used in the present invention.
Figures 17B, 17D:
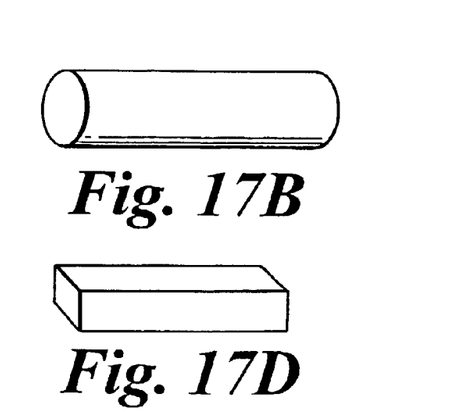
Figure 17C:
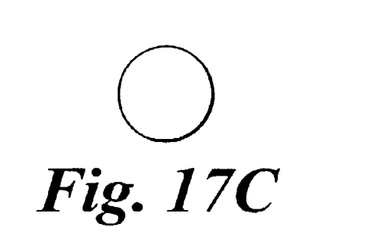
Figure 17E:
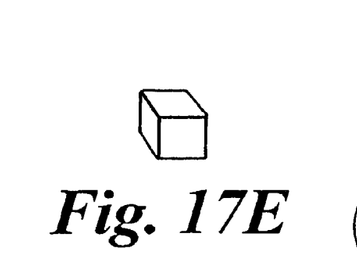

FIG. 16 shows schematically an optical fibre elongate optical element 66 having a core 67 and cladding 68. The core 67 has many aligned photorefractive crystals 69.

FIGS. 17A to 17E show single domain ferroelectric photorefractive crystals of different shapes, including ellipsoidal, cylindrical, spherical, brick-shaped parallelepiped, and cubic. Other shapes are, of course, possible.

Whilst at least the majority of the particles are generally the same shape and generally the same size, there is some variation in length and size.

The particles may be made by breaking up a larger crystalline body, e.g. by grinding/spalling or by chemically breaking them off, or by forming them as small particles initially. The particles could be made prior to combining them with the couplant or they could be made in situ in the couplant. For example, they could be crystallised out of solution. A body of liquid couplant could have suitable chemicals in it or added to it so as to enable crystals to form in the couplant—possibly by coating the liquid couplant/substance mix. Microcrystallisation of photorefractive unidomain single crystals in glass or plastics polymer is attractive.

It is envisaged that the crystal particles, or bulk crystal from which the microparticles are made, could be formed from a congruent melt, but a shoichiometric or subcongruent or supracongruent melt may be used in some circumstances. Changing the oxidation state of the photorefractive material may alter its photorefractivity, optical gain, and may alter its beam coupling properties.

The particles shown in the Figures are in preferred embodiments photorefractive and capable of having a turning-moment inducing dipole, (for reasons that will be described later). However, it may be possible to make suitable non-linear optical bodies with particles that do not have a turning moment inducible on them, and so such a requirement for the material may not be necessary. Although single domain particles are preferred, particles with a plurality of domains could be used. Preferably, however, a multi-domain particle would still be capable of having a turning moment dipole.

How the particles are aligned, if they are to be aligned, is worth considering. A first method of alignment is shown in solid line in FIG. 18. A mobile (e.g. molten) volume 70 of couplant 71 and crystal particles 72 is provided and passed through an alignment aperture 74, for example in a die 76. The die in this example has a restricted passageway 78 extending for the length of several crystals. The crystals have an elongate form. As the fluid mass of couplant and crystals pass through the die, the surface tensional shear/viscous forces of the fluid couplant tends to pull the elongate particles into a generally straight line. Furthermore, in the example of FIG. 18, the particles will not fit in to the passage 78 "sideways". The die could be a plate provided with a hole, or have a substantial length in the direction of extrusion.

In another embodiment the passageway may be wide enough to allow elongate particles to enter sideways, and may have a generally uniform cross-section at longitudinally-spaced regions, or a tapering, progressively smaller, cross-sections at different elongate positions. The passageway may rely upon the effect of fluid flow to "straighten" the particles. Alternatively, the passageway itself may be formed/shaped to cause the particles to become aligned. The alignment process discussed above does not require any dipole on the particles.

Macroscopic alignment can also be achieved by using electromagnetic effects, either instead of, or in addition to, mechanical/fluidic effects. A property of many noncentrosymmetric crystals (e.g. doped lithium niobate) is that they can develop a large photovoltaic field. This was first observed by Glass et al (Applied Physics Letters, Vol. 25, page 233), who noted that optically illuminating a crystal of lithium niobate gave rise to an electric current when the two opposite faces of the crystal were electrically connected. The photovoltaic effect occurs because the electric carrier within these materials reside in asymmetric potential wells. Photo-excited charges therefore move preferentially in one direction. When an electrically isolated crystal of iron-doped lithium niobate ($Fe:LiNbO_3$) is illuminated, a high voltage electric field of more than 100 kV/cm can be developed. If this happens within microscopic single crystal particles of $Fe:LiNbO_3$, each of the particles becomes electrically polarised. This is the key to one way of macroscopically aligning all, or substantially all, of the particles in a couplant/particle matrix.

One simple method of aligning the particles is therefore to heat the couplant/particle matrix (e.g. glass/particle) until the "glass" host is molten and the crystalline particles are free to move. Then illuminating the molten matrix with a strong light source may be sufficient to align the particles with respect to each other. In the molten glass stage, the suspended crystalline particles act as tiny dipoles and tend to line up positive to minus, rather like iron filings in a magnetic field. For plastic based couplant/particle matrixes (as opposed to glass couplant), it may also be possible to align the particles prior to polymerisation, so that heating is not necessarily required (but heat may or may not be applied). Once the particles have been aligned, cooling the glass, or polymerising the plastic, while maintaining the illumination "locks" the particles in the aligned state. The dipole moment experienced by each of the particles will depend on the strength of photovoltaic field, which in turn depends upon the illumination intensity, and also on the packing density of the crystalline particles. Providing the dipole moments are sufficiently strong to overcome the viscous forces and Brownian motion effects within the liquid host, it is possible to align the particles in this way. Alignment is not certain by this method, since this is effectively a phase change in the particle-couplant matrix material, and the reorientation of the particles will be into the most energetically favourable state. This state may consist of a series of localised "pockets" or "cells" in which all of the particles are correctly aligned, but neighbouring cells may have different macroscopic alignment directions with respect to each other. However, arguments based on symmetry tend to suggest that the most energetically favourable state is complete alignment, particularly if the overall volume of particle-matrix material is not too large.

In addition to creating tiny dipoles by illuminating the matrix material, the alignment probability can be increased by applying an external electrical field. This has the advantage that the alignment is not only more certain, but it also occurs along a predefined direction, rather than in a random direction. This is an advantage when casting asymmetrical volumes such as flat plates or rods.

It is possible to apply the techniques locally while extruding or drawing particle-couplant matrix into an optical fibre. This has the advantage that fibre optical systems can be tailored to have a significant non-linear optical response. It is interesting to be able to fashion photorefractive materials into optical fibres, particularly into coherent bundles of optical fibres, for optical limiting and memory devices. The particles could be aligned in the bulk of fluid particle/couplant matrix material before it is cast, or drawn, or spun, as well as (or perhaps instead of) during fibre or body formation, and/or during setting of the fluid matrix material.

Figures 18, 18A, 19, 20:
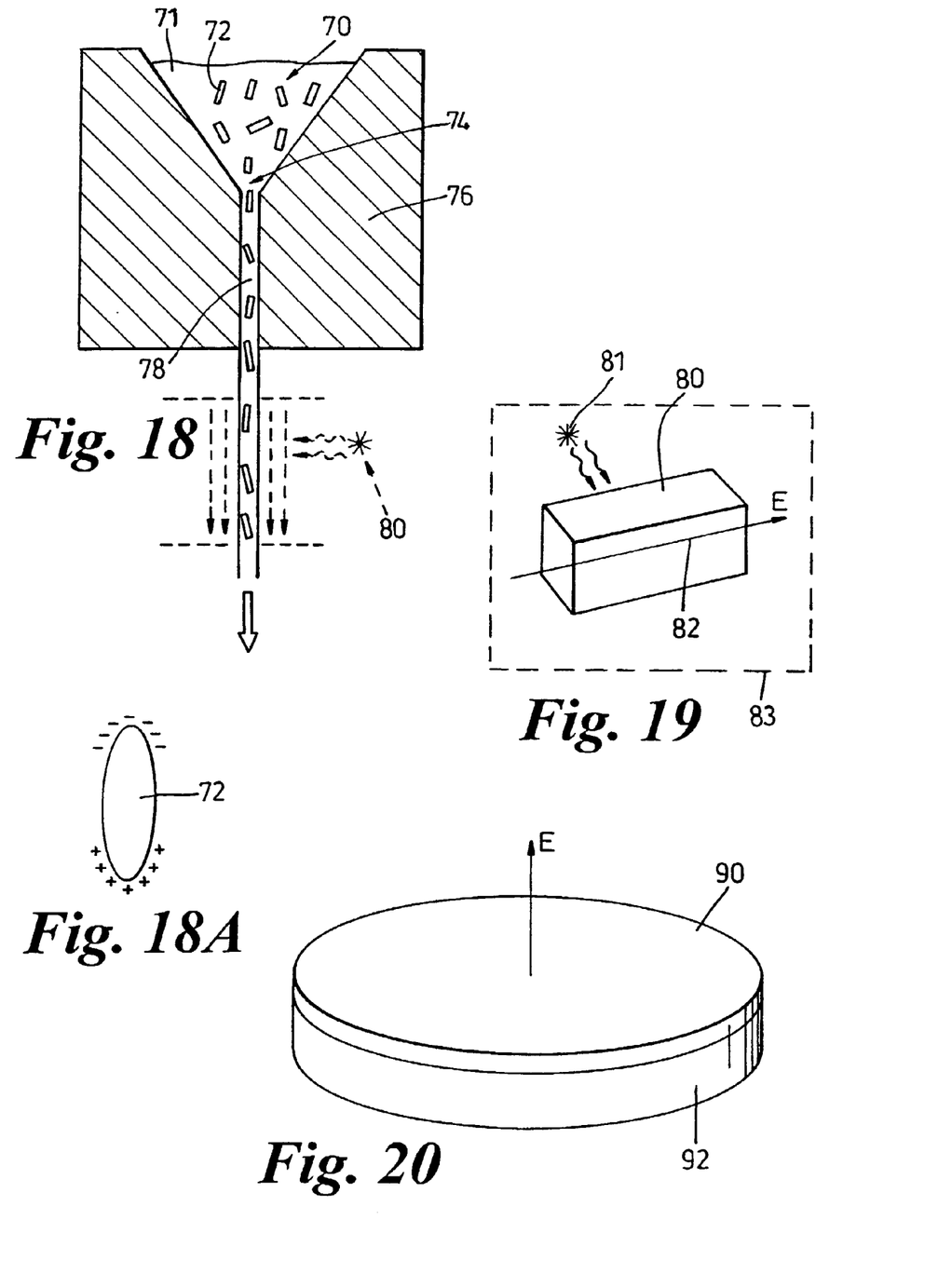
FIG. 18 shows schematically the production of a GPM fibre.
FIG. 18A shows a particle with a dipole charge.
FIG. 19 shows schematically the production of a bulk body of GPM material.
FIG. 20 shows schematically the production of a GPM coating on a substrate.

FIG. 18, with the dotted lines added, shows one way of using a photorefractive effect and an applied electric field to align particles. A light source 80 illuminates the crystal particles 72 whilst they are still mobile in the couplant (e.g. glass) 71. A pair of electrically-biased plates 82 are provided and generate a strong electric field 84. The electric field tends to align the particles with the direction of the field due to the particles having oppositely-charged poles at opposite ends (illustrated in FIG. 18A).

FIG. 19 shows a body 80 of molten glass-particle matrix held in a mould (not shown), with a light source 81 illuminating it, and a strong electric filed 82 being applied. A temperature controlled environment (e.g. a chamber) is represented by dotted line 83. The particles are mobile within the molten glass and align themselves with the electric field. The glass is then cooled, with the electric field still being applied, until the particles are immobilised.

A turning moment field (e.g. an electric field) may be applied whilst crystals are forming. For example, as they are microcrystalised out of solution (e.g. in situ in the particle-couplant matrix), or as they are pulled from a melt.

FIG. 20 shows a coating or layer 90 of photorefractive particle/couplant matrix material applied to an article 92. It is applied with the particles in a mobile state and an electric field applied whilst a dipole is produced in the particles so that he particles are orientated. The electric field could be orientated at angles other than normal to the coating, for example parallel to the coating. The article need not be flat, and the coated surface need not be flat.

Figure 21:
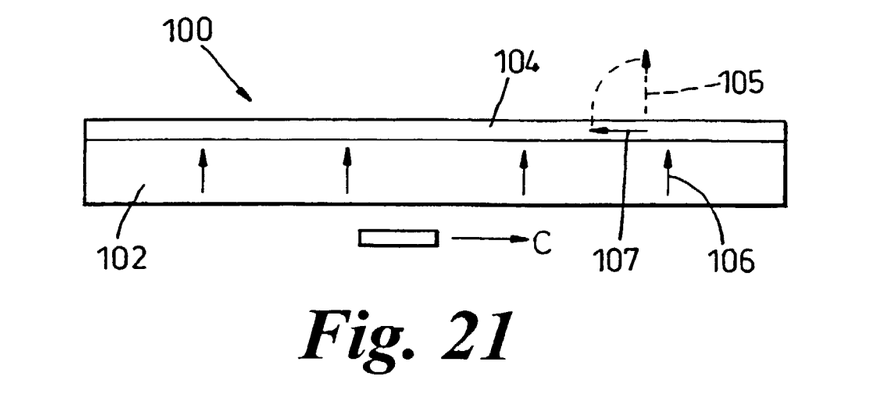
FIGS. 21 and 22 show schematically two different display screens.

FIG. 21 shows schematically a window or screen 100 having a photorefractive particle/glass matrix body 102 with a polarised coating 104. The particles of the matrix are uniaxial or biaxial crystals and have their C-axis extending generally parallel to the surface of the window/screen. The direction of polarisation of the linearly polarised coating 104 is changeable from a first direction 105 generally parallel to the direction of the main refractive index axis of the particles (axis referenced 106) to a second direction 107 generally perpendicular to it. With the main refractive index axis 106 of the particles parallel to the plane of polarisation 105 the window/screen is transmissive to light. With the direction of polarisation 107 perpendicular to the main direction of refractive index, axis 106, of the crystals the window/screen is opaque. Changing the direction of polarisation of the layer 104 can be achieved electrically. This may be used to render a display/window inoperative/non-transmissive, e.g. a VDU display screen.

Figure 22:
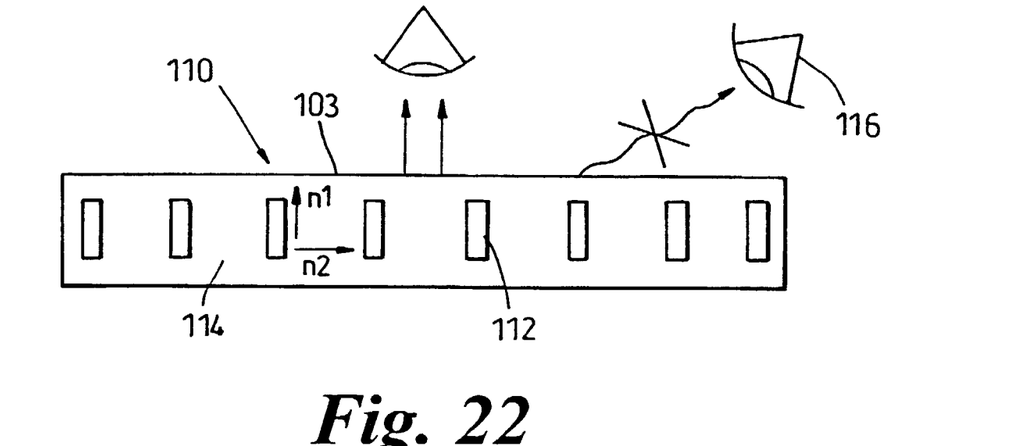

FIG. 22 shows another window/screen 110 in which the crystals 112 are aligned with the refractive index n1 for the C-axis of the crystals perpendicular to the surface 103 of the screen and a second, different, refractive index n2, at 90° to n1. The glass or polymer matrix (referenced 114) of the screen/window have a refractive index of substantially n1. When used directly at 90° to the surface 103 light is transmitted. When viewed at a significant angle, as illustrated at 116, the difference in refractive indices of n2 (crystal) and n1 (couplant) causes scattering and the window/screen is opaque. This may be used as a privacy screen for a visual display unit, or other display device.

It will be appreciated that for the arrangement of FIGS. 21 and 22 the crystals do not necessarily have to be photorefractive—their birefringence is what achieves the desired effect. Protection for a selectively transmissive device using this birefringence effect is desired.

Figure 23:
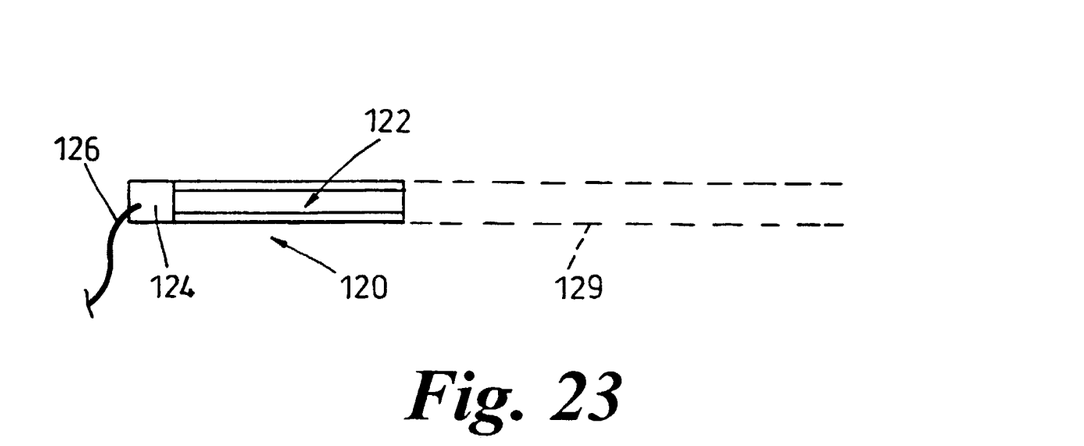
FIG. 23 shows schematically a laser diode integral with a fibre.

A modification to the above embodiments of FIG. 9 onwards is that a diode, such as a laser diode, could be incorporated into the elongate body to provide an integrated unit. FIG. 23 shows a combined laser diode and an optical fibre 120 comprising a clad glass photorefractive particle fibre 122 which is a few centimeters long (e.g. 2 to 4 cm) and a laser diode 124 attached to one end. An electrical power supply is referenced as 126. The unit 120 has a free end 128 which could be coupled/attached to a fibre optic 129 (e.g. of normal glass). A lens could be interposed between the diode 124 and the fibre 122. This could be integral with the diode and fibre. As an alternative, the diode could be provided separately from the fibre 122 and the lens could be provided either as a separate element or as part of the fibre or diode (or both could have lenses).

It is envisaged that optical fibre in accordance with the invention may have applications in the telecommunications industry.

Figure 6A:
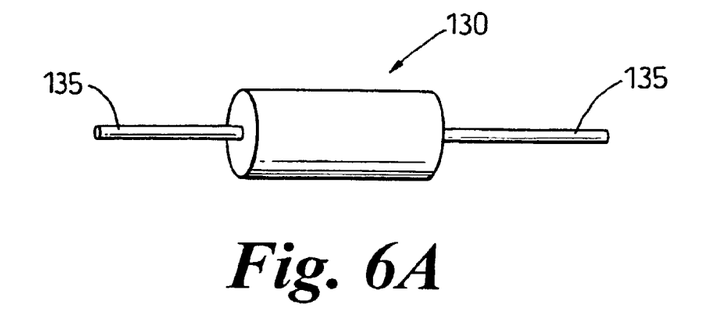
FIGS. 6A, 6B and 6C shows a conventional optical isolator and an optical isolator in accordance with the present invention.
Figure 6B:
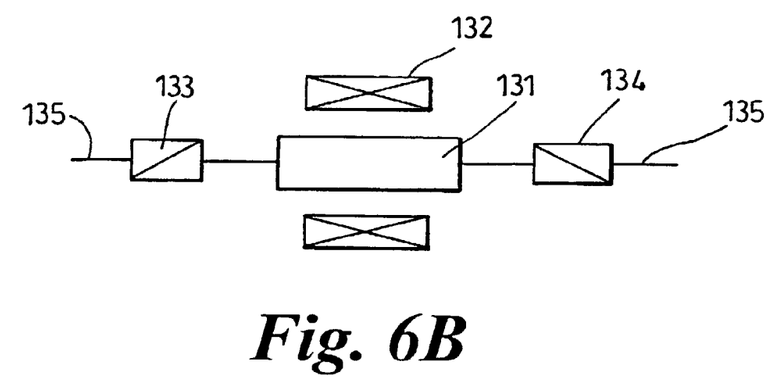

One area of application of the present invention is in optical limiting, or optical isolators. These are used in the telecommunications industry for optical fibre telecommunications lines. A conventional optical isolator 130 is shown in FIGS. 6A and 6B and comprises a Faraday rotator signal crystal 131 surrounded by an electromagnet 132 and with a first linear polariser 133 to one side of the Faraday rotator and a second linear polariser 134, polarising at 90° to the first polariser, to the other side of the Faraday rotator. Optical fibre 135 connects the polarisers and the rotator.

The isolator passes light in one direction, say left to right, but not in the other direction.

It is sometimes desirable to multiplex signals down an optical line by, for example, passing signals of different wavelength. To multiplex the Faraday rotator arrangement of FIGS. 6A and 6B it is necessary to tune the isolator rapidly in real time to accommodate the different multiplexed wavelengths. The system is tuned for one particular wavelength and is sensitive to wavelength changes—if the wavelength changes the magnetic field applied to the rotator 131 needs to change (or the polarisation of one or both polarisers 133/134, or the length of the fibre needs to alter. Furthermore, with a large bundle of optical fibres (e.g. transatlantic cable) the sheer volume of tens or hundreds of isolators 130 can be a problem. Also, if a magnet breaks, or its power supply is faulty, it can render that particular fibre optic line useless. Broad band isolators are available, but they are less efficient than single wavelength versions.

Figure 6C:
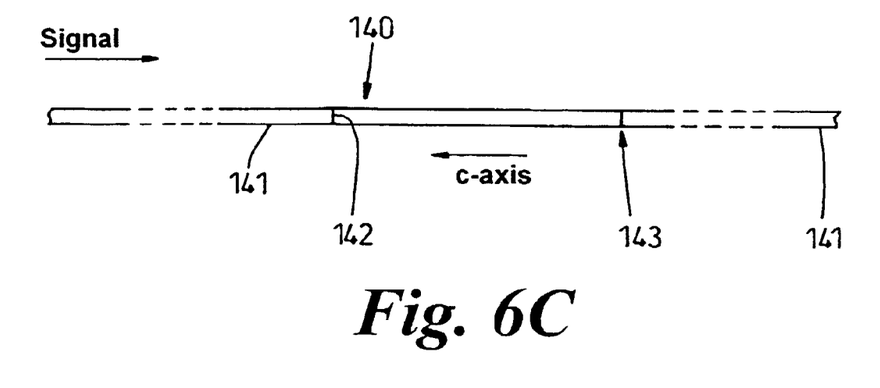

In an alternative isolator shown in FIG. 6C an insert 140 of optical fibre comprising photorefractive particle-glass matrix is inserted into an ordinary optical fibre 141. The particles are uniaxial and are aligned with their C-axis orientated 180° to the forward, permissible, direction of signal down the optical fibre 141. Any light propagating in the allowable direction passes substantially straight through the fibre insert 140. Light attempting to pass in the reverse directions has some reflection off face 142 of the insert 140 (or of the interface between the insert and normal optical fibre), and this reflection interferes with the forward beam to write a photorefractive hologram, in real time, which has destructive interference for light output in the reverse direction, but constructive interference for light in the forward direction, and so the "reverse" direction light is coupled back into the forward beam. This effect can counter reflections off interface 143. It will be appreciated that since each signal writes its own interference hologram, the isolator of FIG. 6C is far less wavelength-dependent than that of FIGS. 6A and 6B (so long as the refractive indices of the photorefractive particles match at the multiplex frequencies in operation to a degree necessary for any scattering from the particles to be acceptable). The coherence length of the light should be comparable with, or longer than, the length of the particles so that fringes exist throughout their volume. The coherence length should be at least as long as the particles. Preferably, it should be as long as the fibre for best efficiency. It automatically self-tunes for different wavelengths, and needs no power supply. Furthermore, the conventional optical isolators are quite lossy, and the new isolator may improve this.

The present invention also has application to optical memories/data storage. It is possible to write holograms in a body of photorefractive material by interacting a pump laser beam with a writing/signal laser beam. It is envisaged that the hologram storage/media body may be a particle couplant matrix.

Because of a desire to use the volume of memory efficiently, it is desirable to multiplex holograms in the same volume of storage media by changing the viewing/writing angle, or wavelength, or polarisation between different holograms which occupy the same volume. It is desirable to use narrow laser beams so that it is possible to have more discrete hologram sites in a given body of storage media. However, cross-talk between storage positions can occur and this reduces image/data quality. In order to reduce cross-talk it is desirable to divide up a volume of storage media into discrete separate volumes, for example an array of mini-bodies, which may have generally parallel sides with interfaces between adjacent side surfaces. A collection of mini-bodies may comprise a larger optical memory storage body.

Figure 24A:
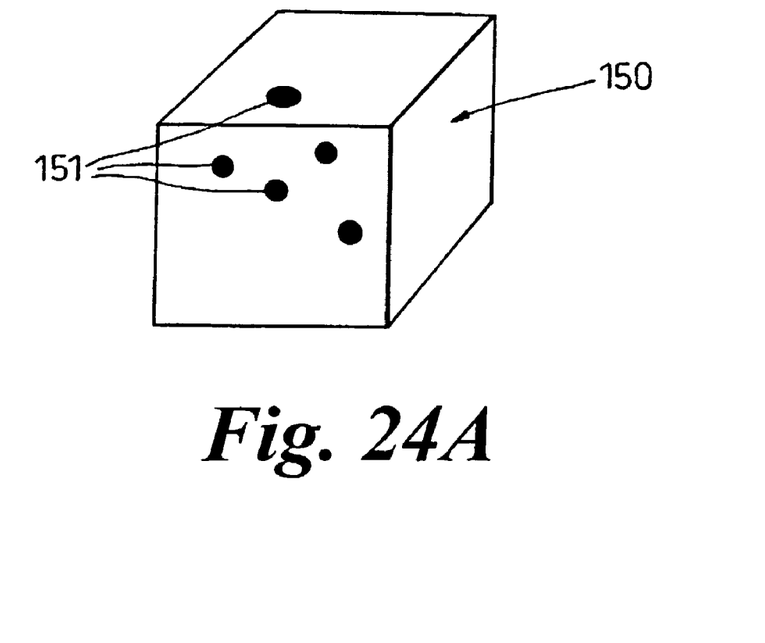
FIGS. 24A and 24B show schematically two optical memory storage devices.

FIG. 24A shows a solid block optical memory device 150 of glass photorefractive particle matrix (or plastics polymer-particle (photorefractive region) material), with different hologram memory regions 151 distributed in its volume. If the regions 151 are too close image/data storage, or recall, can be degraded. The device 150 is easier and cheaper to make than a single solid crystal.

Figure 24B:
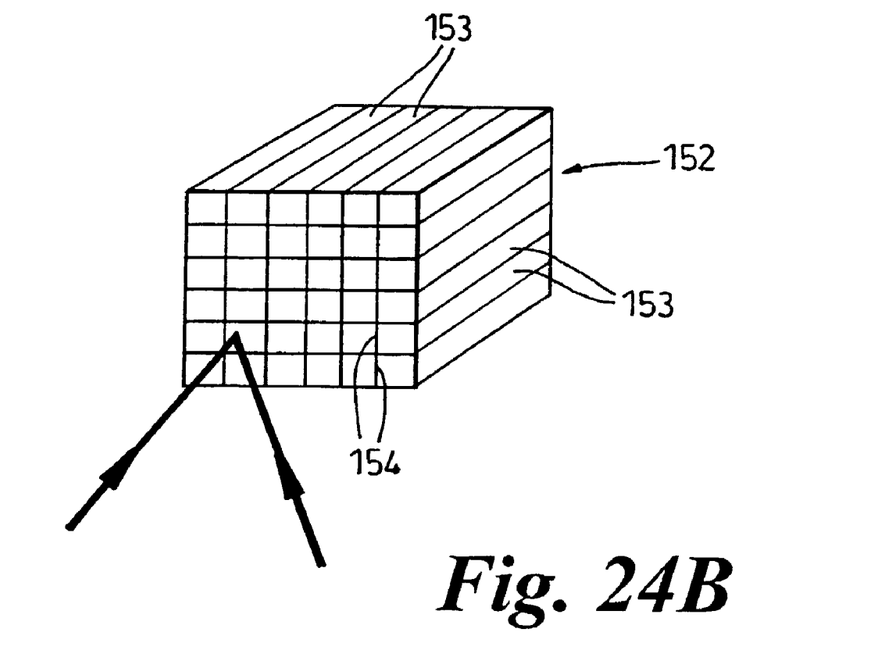

FIG. 24B shows an alternative memory storage device 152 which comprises discrete bodies 153 of photorefractive material (or couplant/photorefractive material matrix) with interfaces 154 between adjacent bodies 153. The bodies 153 have flat sides which are in face-to-face contact at the interfaces 154. The interfaces help to reduce cross-talk between holograms stored in different bodies 153. The bodies 153 may be bonded together. A suitable couplant may be provided between adjacent bodies (possibly of a different refractive index). The bodies may be elongate as shown, or generally cubic, or even have curved surfaces. The bodies may comprise filaments or fibres.

It will be appreciated that for optical memory uses it may not be necessary to align photorefractive particles in the particle/couplant matrix.

The main effect wanted in optical limiting is reflection from the particles. A limiter with a matrix of randomly orientated photorefractive particles will have some in a suitable orientation for reflection and light will eventually hit a particle orientated for back-reflection and the desired effect will be achieved. Particles orientated in a "transmissive" orientation do not destroy the reflective contribution of those particles that are appropriately orientated for effective optical limiting usage. Thus, a photorefractive particle or region—couplant matrix with the particles/regions randomly orientated (or not aligned) is still useful.

It will be appreciated that fanning/divergence effects of the particles on the matrix can be restricted by the walls/interfaces of the fibres/matrix bodies.

By way of illustration, a 1 cm fibre with about 2,000 5μ length particles of photorefractive material in it, and a diameter of 1μ is projected to have 98% transmission of light if the refractive index of the particles is matched to the refractive index of the couplant to 0.01. Transmission rises to 99.98% of the Δn is 0.001. Transmission falls to 13.87% if there are 2,000 particles with a Δn of 0.1.

Whilst terms such as "optical", and "light" have been referred to, and whilst the visible spectrum is the most preferred wavelength of interest, the invention is applicable in principle to all electromagnetic waves, including infrared, ultraviolet, microwave, and X-ray, and such terms as "optical", and "light" should be given an equivalent broad meaning.

Figure 26:
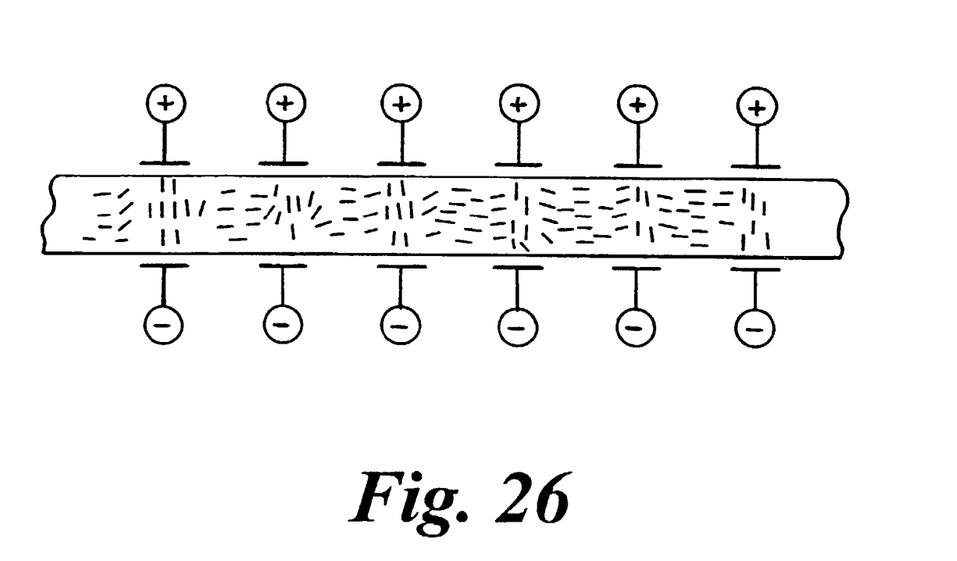
FIG. 26 shows an alternative photorefractive body and a way of making it.

FIG. 26 shows a body 160 of couplant material 161 and photorefractive particles 162. The body may be a fibre or other body, e.g. bulk body, and may or may not be elongate. The particles are very small (<<λ of the light used). For example, for light of 500 nmλ, the particles may be 50 nm long, or less. The particles are small enough that they do not bulk scatter. The particles 162 are aligned periodically in the body; regions 164 of the body have particles, referenced 162' aligned with each other. The regions 164 are equi-distantly spaced along the length of the body (in this example—in another example it may be possible/desirable to have the regions 164 unequally spaced). The periodic alignment gives a periodic change in the refractive index of the body. Regions 166 exist between the aligned regions 164. The particles 162 in the regions 166 may be substantially randomly aligned, or have an ordered alignment in a different direction to that of the regions 164.

Figure 25A:
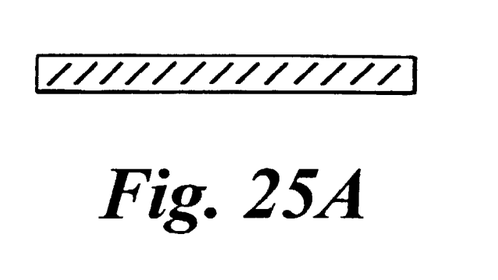
FIGS. 25A and 25B show alternative fibres with their photorefractive particles aligned in different directions.
Figure 25B:
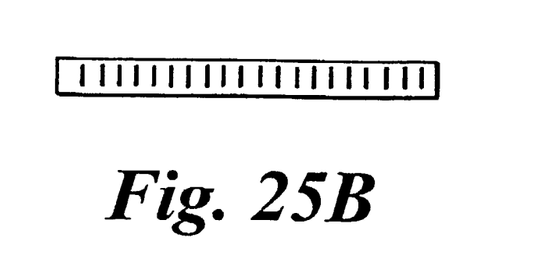

FIGS. 25A and 25B show bodies, in this case fibres, with photorefractive particles aligned in directions other than the elongate direction of the body. FIG. 25A shows the particles aligned at about 45° to the elongate direction (but 30°, 60°, or some other is also envisaged), and FIG. 25B shows the particles aligned at about 90° to the elongate direction. Such arrangements may have uses in memory devices.

The concentration of particles 162 in the couplant 161 may be substantially uniform along the body (across regions 164 and 166), or the regions 164 may have a different particle density than the regions 166 (higher or lower). This may also alter the refractive index of its body. Indeed, having periodic regions of different density of particles per unit volume of body, without necessarily altering the alignment of the particles, may be another way of achieving periodic refractive index variations (but the preferred way is to have a substantially uniform particle density and have periodic aligned regions). The body 160 could be used in Bragg reflectors, e.g. for fibre applications, or in novel filters (preferably as a bulk body).

FIG. 26 also shows how the body 160 could be made. An array of electric field generators 168, in this case positively and negatively charged plates 169, 170 are provided with a suitable periodicity and the body is formed from a liquid couplant-particle matrix (or otherwise particle-mobile matrix), and the electric field (particle orientation means) applied whilst the particles are mobile. The particles are allowed to orientate themselves, and the couplant-particle matrix is set/solidified to fix the alignment of the particles. The body 160 can then be taken out of the manufacturing zone.

It will be appreciated that when the material for the particles is chi(2), a non-centrosymmetric medium, it can be photorefractive. The devices may be for a wide range of things, not just data storage, and do not necessarily need an applied electric field to function. The device need not necessarily require two applied beams to function, but can work with just one beam. The particles in the matrix are preferably of diameter comparable with or greater than, optical wavelengths. Some embodiments of the invention use an induced space charge field to achieve their effect. Some devices rely on optical fringe generation for their effect and require coherent light to operate properly. The invention allows simultaneous optical transmission through optical devices at all transmitted wavelengths (other than the pump wavelengths—a "see-through" capability) when operating. The particles should be at least bigger than one fringe spacing for optimum performance of the device.

The invention claimed is:

1. An optical body for use with visible light, the body having non-linear optical properties for light at a said visible light wavelength, the body comprising:
   regions or particles of a first material; and
   a couplant material for optically coupling said regions or particles of said first material, the first material comprising non-linear optics photorefractive material and the regions or particles being large enough to establish a diffraction pattern of regions of different refractive index within each particle when coherent light of said visible light wavelength interferes within the particles, and the couplant material being substantially transparent at said visible light wavelength, wherein said regions or particles of first material are substantially randomly distributed in the optical body.

2. A body according to claim 1 in which regions or particles have a dimension of the order of a micrometer.

3. A body according to claim 2 in which the regions or particles have a dimension in the range 0.5 μm to 5 μm.

4. A body according to claim 2 in which the regions or particles have a dimension of 1 to 3 μm.

5. A body according to claim 2 in which the particles have a size of at least 400 nm.

6. A body according to claim 1 in which the refractive index of the first material is matched to that of the couplant material to at least one decimal place.

7. A body according to claim 1 in which the first material comprises a photorefractive material which is capable of producing a significant voltage across a particle of the material.

8. A body according to claim 1 in which the particles or regions of first material comprise single crystals with a single crystal domain.

9. A body according to claim 1 in which the regions or particles have an elongate shape and are orientated in substantially a common direction, or at least a significant number of adjacent particles or regions are substantially orientated in a common direction.

10. A body according to claim 1 which has an elongate length, and in which the regions or particles have an elongate length, and in which particles or regions are aligned with the longitudinal direction of the body.

11. A body according to an claim 1 in which the particles are capable of having a turning moment produced on them.

12. A body according to claim 11 in which said turning moment can be achieved by the particles having, or being capable of having, an electric dipole.

13. A body according to claim 1 which comprises a plurality of spaced first zones, each first zone having its regions or particles of non-linear optics material generally orientated in a direction that is common to that first zone, and second zones interspersed between the first zones in which no substantial ordering of the regions or particles exists.

14. A body according to claim 1 in which the first material is from the list: lithium niobate, lithium tantalate, potassium lithium niobate, lead manganese niobate, barium titanate, strontium barium titanate, strontium barium niobate, potassium sodium barium niobate, a niobiate, a titanate, a tantalate.

15. A body according to claim 1 in which the regions or particles have a pump wavelength, and in which the body allows simultaneous optical transmission of transmitted optical wavelengths, other than at the pump wavelength.

16. A device having an optical body in accordance with claim 1.

17. A device according to claim 16 which comprises at least one of:
   i) an optical limiter;
   ii) an optical isolator;
   iii) an optical memory;
   iv) a beam coupler;
   v) a phototonic crystal device;
   vi) a phototonic bandgap device.

18. A method of providing or making a body having a non-linear optical property when using a coherent visible light wavelength, comprising the steps of (i) providing a plurality of particles or regions of non-linear optical photorefractive material, the regions or particles having a size that is large enough to create a diffraction pattern of regions of different refractive index within a particle, and (ii) coupling the particles together with an optical couplant material that is substantially transparent at the visible light wavelength, wherein step (ii) comprises randomly distributing said regions or particles of first material within said body.

19. A method according to claim 18 comprising having crystalline particles or regions with a crystallographic axis and aligning at least one axis of the crystalline particles in the body.

20. A method according to claim 18 comprising aligning the particles by the effect of a flowing fluid.

21. A method according to claim 20 in which the fluid carries the particles through a passageway, and in which the particles are of such a length that they are constrained to enter the passageway in substantially a single orientation, or in a limited range of orientations.

22. A method according to claim 18 comprising creating a dipole moment on the particles so as to cause alignment of the particles.

23. A method according to claim 22 in which the dipole is created by illuminating a photovoltaic particle or region; or by causing strain in a piezoelectric particle or region; or by heating a pyrovoltaic particle.

24. An optical body for use with coherent electromagnetic radiation at an intended wavelength, the body having non-linear optical properties for electromagnetic radiation at said intended wavelength, the body comprising regions or particles of a first material optically coupled by a couplant material, the first material comprising non-linear optics photorefractive material, and the regions of particles being of a size that is large enough to allow the creation of optical fringes, in use, when coherent light of said intended wavelength interacts with the particles, and the couplant material being substantially transparent to electromagnetic radiation at said intended wavelength wherein said regions or particles of first material have a size of at least 0.1 μm and are substantially randomly distributed in the optical body.

* * * * *